US006633416B1

(12) United States Patent
Benson

(10) Patent No.: US 6,633,416 B1
(45) Date of Patent: Oct. 14, 2003

(54) COMPUTER SCANNER FOR THREE-DIMENSIONAL OBJECTS

(75) Inventor: Paul H. Benson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,554

(22) Filed: Jan. 10, 2000

(51) Int. Cl.[7] ............................................... H04N 13/02
(52) U.S. Cl. ....................... 358/478; 358/471; 358/474; 358/477
(58) Field of Search ................................. 358/471, 474, 358/478, 477; 348/46

(56) References Cited

U.S. PATENT DOCUMENTS

| D270,317 S | 8/1983 | Fleming | |
|---|---|---|---|
| 4,447,958 A | * 5/1984 | Tanaka | 33/561 |
| 4,536,980 A | 8/1985 | Fleming | |
| 4,654,989 A | 4/1987 | Fleming | |
| 4,872,269 A | 10/1989 | Sattmann | |
| 4,876,758 A | 10/1989 | Rolloff et al. | |
| 5,430,597 A | * 7/1995 | Bagepalli et al. | 361/102 |
| 5,546,668 A | 8/1996 | Ahdoot | |
| 5,640,779 A | * 6/1997 | Rolloff et al. | 33/514.2 |
| 5,689,446 A | 11/1997 | Sundman et al. | |
| 6,286,227 B1 | * 9/2001 | Corby, Jr. | 33/813 |

* cited by examiner

Primary Examiner—Chris Kelley
Assistant Examiner—Charles Parsons
(74) Attorney, Agent, or Firm—Carlos Munoz-Bustamante Bracewell & Patterson, LLP

(57) ABSTRACT

A personal computer scanner for scanning the three-dimensional (3D) objects has a frame with an axis, and a front plate. The front plate has a large array of axial pinholes that each contain a slidably movable pin to form a bed of pins. A detection device is slidably mounted near the rear of the frame. A stepper motor is used to move the detection device relative to frame. The detection device has a sensor plate on its front surface with an array of sensors that correspond one-to-one with the pins. The user selects an object to be scanned and inserts it into the bed of pins to form an impression. The pins readily move and comply to the contours of the object. After the impression is made, the detection device is slowly incremented by the stepper motor toward the pins. The individual sensors are monitored by a host computer until they have been contacted by their respective pins. When a sensor has been touched by its pin, the sensor is scanned by the computer to record the displacement of the pin. This step is repeated until each paired sensor and pin make contact. With this information, the host computer digitally reconstructs the surface of the object scanned based on the displacements of the pins.

18 Claims, 3 Drawing Sheets

COMPUTER SCANNER FOR THREE-DIMENSIONAL OBJECTS

BACKGROUND OF THE INVENTION

1. Technical Field:

This invention relates in general to computer scanners and in particular to a computer scanner for scanning a three-dimensional object in order to acquire a three-dimensional digital representation of the object.

2. Description of Related Art:

As the speed and capability of personal computers (PC's) has increased, so has the desire to display three-dimensional (3D) representations of objects. In particular, some PC video games allow users to scan their faces onto the characters in the game. Previous scanning devices have used generic bmp-mapping to perform this task with some success. In addition, virtual reality markup language (VRML) allows 3D worlds to be viewed with standard net browsers.

Although PC devices or scanners for scanning two-dimensional objects such as photographs have existed for many years, they have become popular only in the last few years due to lower prices and the capability to scan and represent colors. There are also a few 3D scanners currently available. Currently, 3D scanners are very expensive compared to 2D scanners. One type of 3D scanner employs a laser and a large rotating sensor to quickly generate a full 3D image of an object.

Another 3D "scanning" technique also uses a physical 3D model of an object. The designer draws a "mesh" of polygons (usually triangles) directly on the model. The polygons cover the entire surface of the model. Large flat surfaces are simulated with large polygons, while areas that need more 3D detail are simulated with smaller polygons. The model is fixed to a stable surface and the designer uses a digital stylus to point to each vertex in the mesh. The stylus is connected to an extensible, multi-jointed sensor arm. As the tip of the stylus is articulated to the various surface points on the surface of the object, the precise angles formed by the joints of the arm at each point are fed to a PC. The PC uses the data to form an electronic 3D representation of the object. Although these, designs are workable, they are complicated designs and either prohibitively expensive or time consuming for most users. Thus, a more affordable 3D scanner that is, easy to use is needed.

SUMMARY OF THE INVENTION

A personal computer scanner for scanning the three-dimensional (3D) objects has a frame with an axis, and a front plate. The front plate has a large array of axial pinholes that each contain a slidably movable pin to form a bed of pins. A detection device is slidably mounted near the rear of the frame. A stepper motor is used to move the detection device relative to frame. The detection device has a sensor plate on its front surface with an array of sensors that correspond one-to-one with the pins.

The user selects an object to be scanned and inserts it into the bed of pins to form an impression. The pins readily move and comply to the contours of the object. After the impression is made, the detection device is slowly incremented by the stepper motor toward the pins. The individual sensors are monitored by a host computer until they have been contacted by their respective pins. When a sensor has been touched by its pin, the sensor is scanned by the computer to record the displacement of the pin. This step is repeated until each paired sensor and pin make contact. With this information, the host computer digitally reconstructs the surface of the object scanned based on the displacements of the pins.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
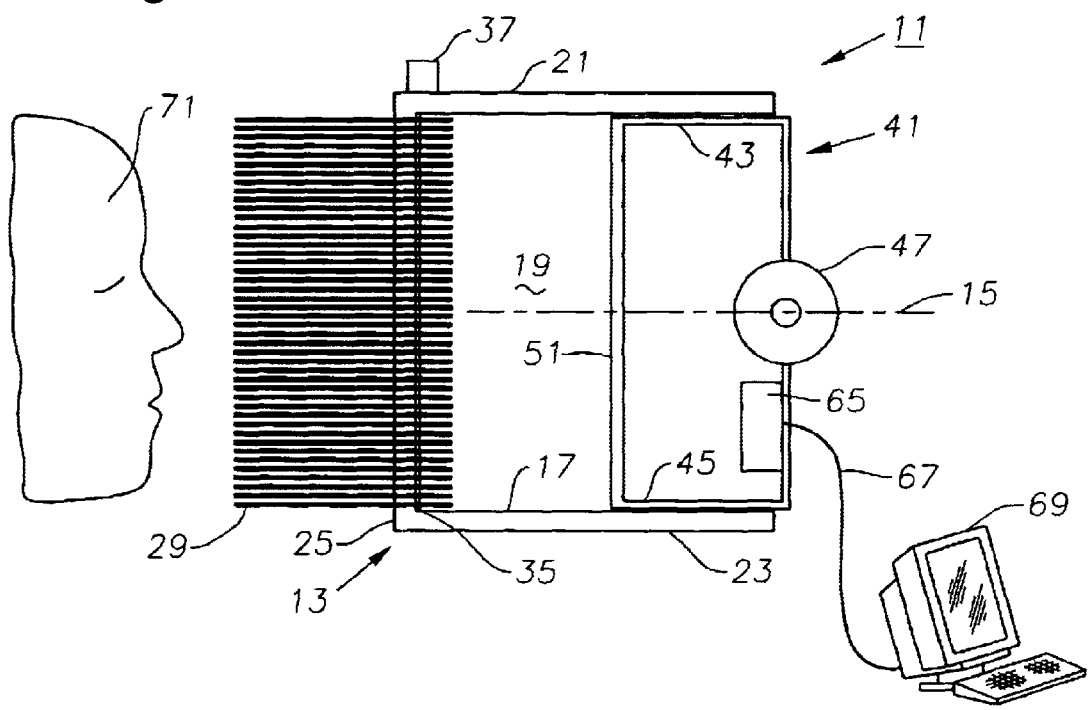
FIG. 1 is a schematic side view of a 3D scanner constructed in accordance with the invention and shown at an initial stage of use.

Referring to FIG. 1, a personal computer scanner 11 for scanning the outer surface of three-dimensional (3D) objects is shown. Scanner 11 has a hollow, rigid frame 13 with a longitudinal axis 15, and an interior surface 17 that defines an unobstructed chamber 19. Interior surface 17 and chamber 19 may be sealed from the exterior with side walls (not shown) or open as illustrated. Frame 13 is preferably rectangular with orthogonal frame members so that it may be readily positioned and stable when placed on a flat support surface. However, frame 13 may be formed in many different shapes and sizes, depending upon the particular application and the shape and size of the objects to be scanned.

In the embodiment shown, the frame members of frame 13 include a top member 21, a bottom member 23, and a front member 25. Front member 25 is a relatively thick wall with a large symmetrical array of pinholes 27 (see FIG. 5 for comparison) that are oriented parallel to axis 15. Pinholes 27 substantially extend across the entire surface area of front member 25, from top to bottom and left to right. Each pinhole 27 contains a movable, elongated straight pin 29 having blunt ends. Although pins 29 are closely received in their respective pinholes 27, they are movable relative to front member 25 in directions parallel to axis 15. Pins 29 are identical to one another and have a length that is approximately half that of the orthogonal frame members 21, 23. Pins 29 have a limited range of longitudinal travel so that they remain slidably mounted in their respective pinholes 27 without falling out.

Figure 5:
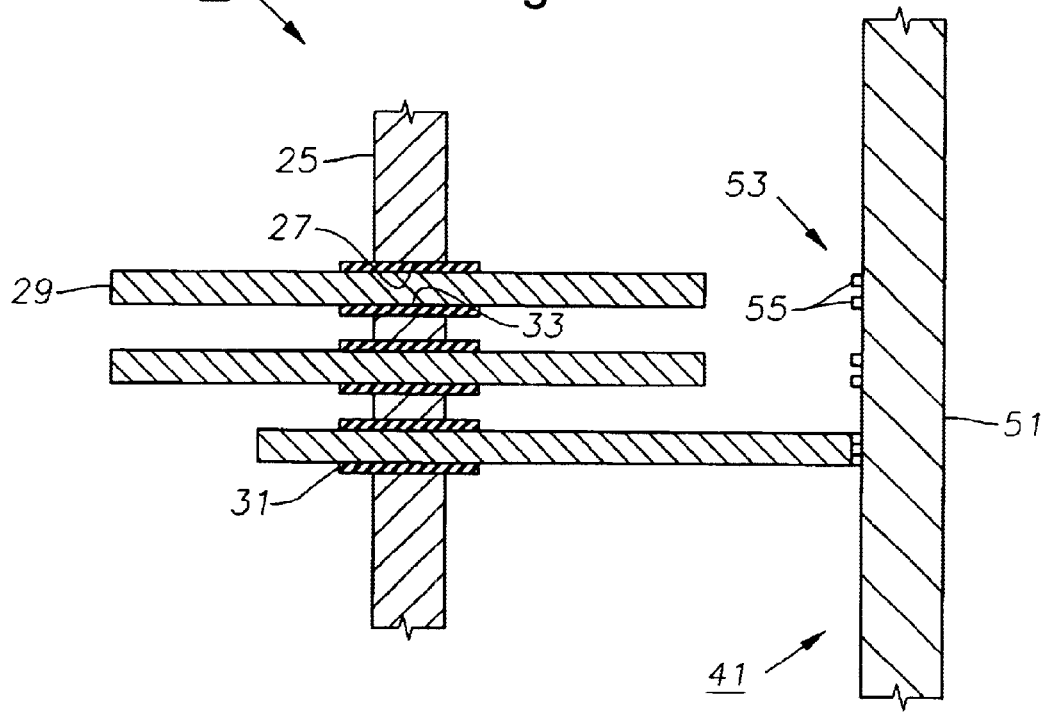
FIG. 5 is an enlarged sectional side view of a first embodiment of a reader for the scanner of FIG. 1.

In the alternate embodiment of FIG. 5, each pinhole 27 contains a cylindrical plastic sleeve 31 that is stationarily mounted therein. In this version, pins 29 are closely and slidably received in small, longitudinal holes 33 in sleeves 31 to form a rectangular array of pins 29. Sleeves 31 are optional restraint mechanisms that frictionally engage pins 29. Sleeves 31 do not disrupt the longitudinal movement of pins 29 when they are forcibly motivated, but, merely restrain them from incidental sliding motion relative to front member 25.

In another alternate embodiment, sleeves 31 may be replaced by a single sheet of rubber or plastic 35 that is mounted flush on front member 25. Sheet 35 has axial holes for receiving pins 29. The holes in sheet 35 are larger than pins 29 such that they typically would not restrain the movement of pins 29. Upon actuation, an adjacent latching mechanism 37 shifts the sheet 35 (up, down, left, or right) just enough to pinch pins 29 between front member 25 and sheet 35. This contact is sufficient to restrict slight movements due to minor jostling, but will not impede deliberate force applied to pins 29.

A reader or detection device 41 is located within the stationary frame 13 and has upper and lower members 43, 45 that are slidably mounted to frame members 21, 23, respectively. Device 41 is limited to longitudinal movement along axis 15 of frame 13 in both the forward (left) and rearward (right) directions. Device 41 may be mounted to frame 13 on bearings, rollers, low friction surface interfaces, or other motion-allowing components as are commonly known in the art. Device 41 is moved relative to frame 13, or vice-versa, with a stepper motor 47 (shown schematically), coupled therebetween. Alternatively, device 41 may be moved manually.

Figure 6:
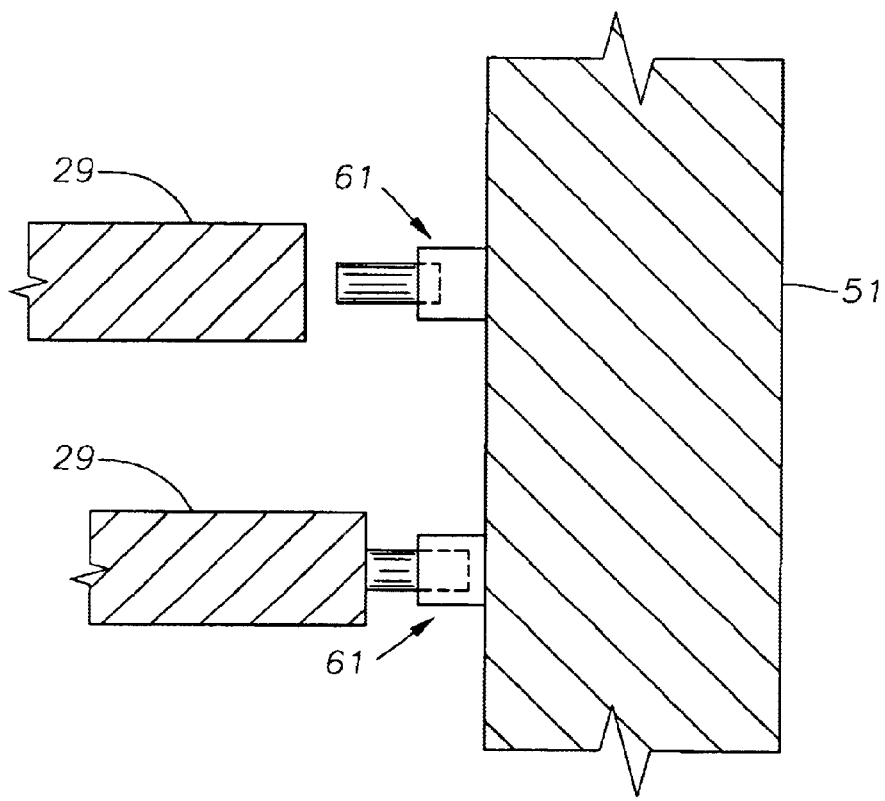
FIG. 6 is an enlarged sectional side view of a second embodiment of a reader for the scanner of FIG. 1.

Detection device 41 has a front wall comprising a sensor plate 51 that is substantially orthogonal to upper and lower members 43, 45, and frame members 21, 23. Sensor plate 51 has a symmetrical array of sensors 53 (FIG. 5) on its front surface that are individually aligned with one of pins 29 along axis 15. In the embodiment of FIG. 5, each sensor 53 comprises a pair of small contacts 55 that are closely spaced apart. When the rear end of one of pins 29 touches contacts 55, a circuit is completed to indicate the relative, position of said one of pins 29. Alternatively, sensor plate 51 may be provided with momentary single-pole single-throw switches 61 (FIG. 6). To aid in the event that a pin 29 causes momentary contact with a contact 55 or switch 61, a logic gate, such as a set-reset flip-flop, may be utilized in order to latch the sensor's (55 or 61) activation. The flip-flops are initially cleared at reset, but when the switch 61 is depressed (bottom of FIG. 6) or two contacts 55 are shorted, the flip-flop latches. The flip-flop cannot be cleared except by reset. For operation, flip-flops are not required, but if a pin 29 only makes momentary contact with sensor 53 or switch 61, then it may not be properly detected.

Software is used to scan each sensor, either directly or through a flip-flop 61, to see if a pin 29 has been detected. One possible scanning method would be to use row-column addressing which is typically used in keyboards for key press detection. But other methods are obvious to those skilled; in the art. Detection device 41 also contains a sensor circuit board 65 for processing the signals detected by sensor plate 51. Sensor circuit board 65 incorporates a microcontroller to monitor sensors 53 or 61. The microcontroller could also provide an interface 67 to a computer 69 or the microcontroller could interface with other circuitry, such as an interface controller, to communicate with the computer 69. Interfaces include, but are not limited to, a serial, a parallel, or a USB interface 67.

In operation, the user selects an object to be scanned such as his face 71 (FIG. 1). At the initial stage of use, pins 29 are extended or reset to the front (left), such that only a small portion of their lengths are located inside frame 13. The front and rear ends of pins 29 are vertically and horizontally aligned with each other. The user inserts his face 71 into the array or bed of pins 29 along axis 15 (to the right) to form an impression 73 (FIG. 2) of the surface of face 71. Pins 29 readily move and comply to the contours of face 71 with minimal force, but are sufficiently restrained (either by sleeves 31 or other means) to resist unintended displacement. The user should be careful not to touch front member 25 of frame 13 with the object being scanned. The object is then carefully removed from the bed of pins 29 in the opposite longitudinal direction (to the left) without disturbing impression 73.

Figure 2:
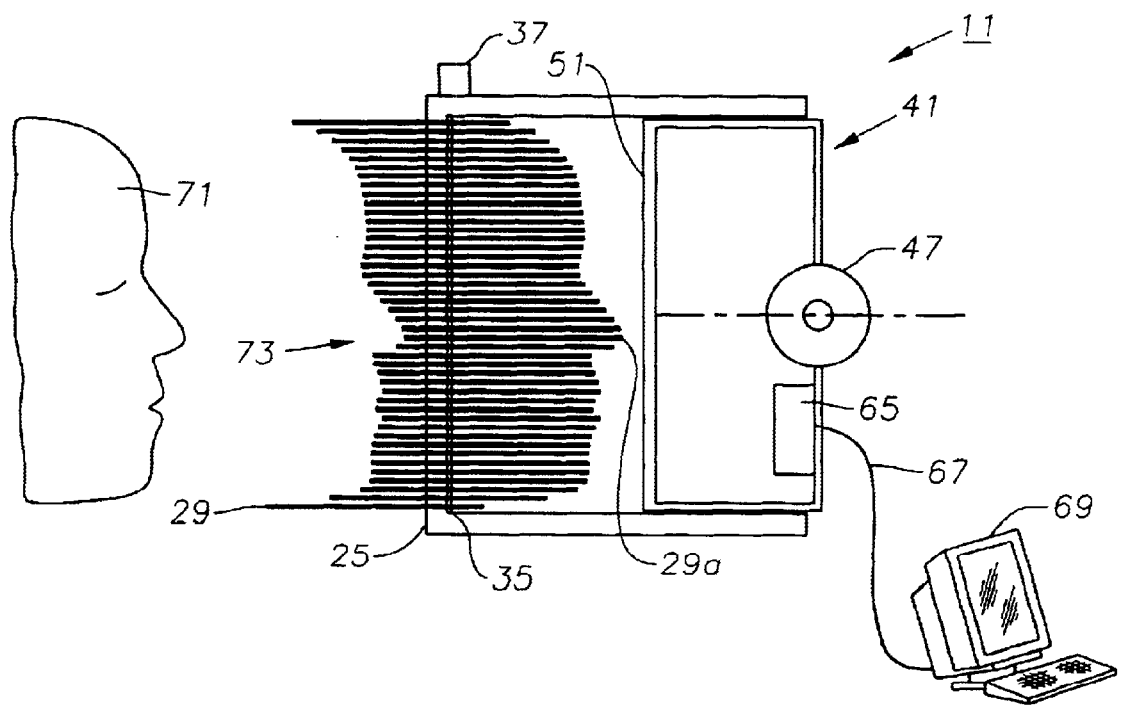
FIG. 2 a schematic side view of the scanner of FIG. 1 shown after an impression has been made.

As shown in FIG. 2, impression 73 forms a "negative" or depression of the surface of the object on the exterior (left) of scanner 11, and a perfectly complementary "positive" or embossment of the surface of the object on the interior of scanner 11. Thus, each individual pin 29 is longitudinally displaced by the object to create a contour of its outer surface. After impression 73 is made, scanner 11 should be placed on a stable support surface to start the scanning process. If scanner 11 is equipped with a pin restraint or latching mechanism, the mechanism should be employed prior to removal of the object.

Figure 3:
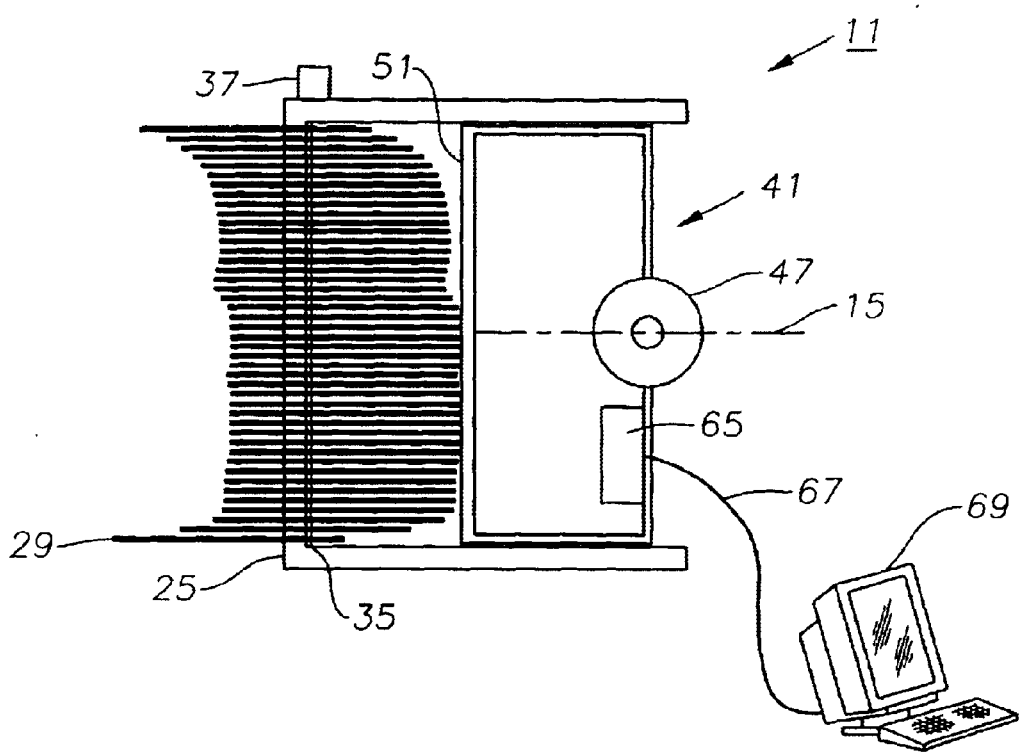
FIG. 3 a schematic side view of the scanner of FIG. 1 shown at an intermediate stage of reading the impression of FIG. 2.
Figure 4:
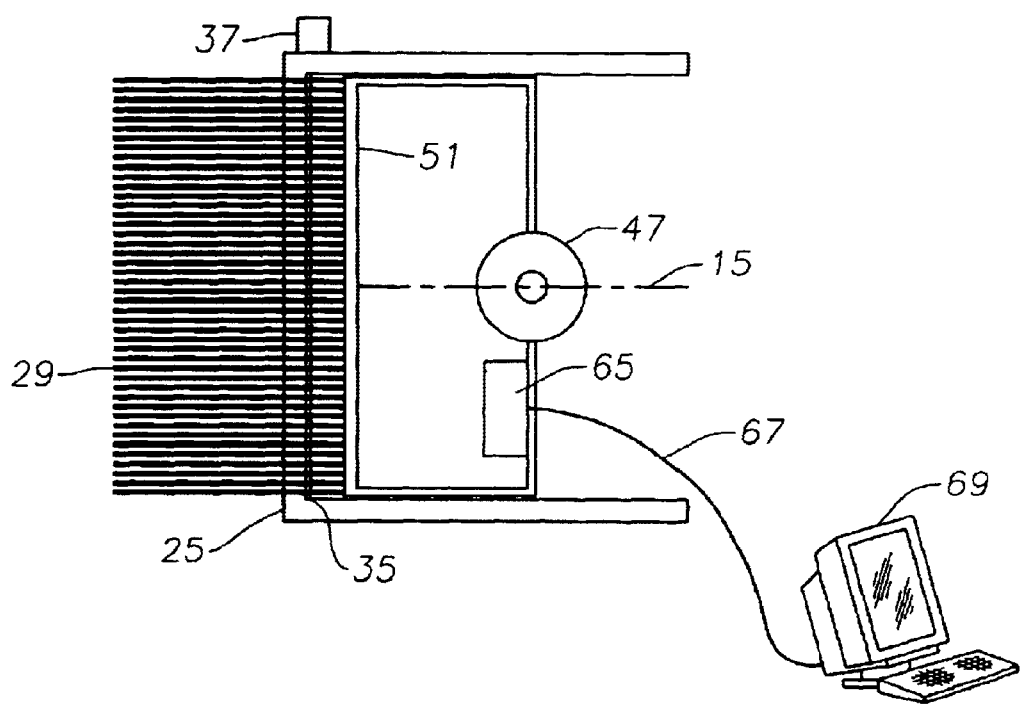
FIG. 4 a schematic side view of the scanner of FIG. 1 shown at a final stage of resetting the scanner.

In the next step (FIG. 3), detection device 41 is slowly moved along axis 15 by stepper motor 47 toward pins 29. In the preferred embodiment, a stepper motor 47 moves sensor plate 51 toward the rearward ends of pins 29 in very short increments. The step-wise progression of sensor plate 51 can be controlled by computer 69 or automated by scanner 11. In the example illustrated, the first pins 29 encountered by sensor plate 51 are the rearwardmost pins 29a (see FIG. 2). Each pin 29 is axially aligned with a sensor such as sensor 53, for example, described above. Each sensor 53 is scanned by sensor circuit board 65 at each incremental step before motor 47 advances to the next step. When a sensor 53 is contacted by its associated pin 29, it is scanned by board 65 and computer 69. In this way, the axial displacement of each individual pin 29 is measured and relayed to computer 69 through interface 67. The information collected by scanner 11 for each pin 29 can be sent to computer 69 individually or buffered by scanner 11 to send out a burst of data. Once a pin 29 has been contacted by its sensor 53, it will be pushed along to the left as the remaining pins 29 are scanned. This step is repeated for each paired sensor 53 and pin 29 until every sensor 53 has been contacted. When detection device 41 reaches the end of its track (FIG. 4), pins 29 are reset to their original starting positions and stepper motor 47 returns detection device 41 to its starting position (FIG. 1) to scan the next object or another surface of the object.

With the proper software, a composite 3D representation of an object can be pieced together by making an impression and scanning the various surfaces of the object. For example, if the object scanned is smaller than the perimeter defined by pins 29 (i.e. it can be completely embedded in the array of pins 29), scanner 11 can typically scan the entire object with only two impressions (a front side impression and a back side impression). However, if the object scanned is larger than the perimeter defined by pins 29, multiple impressions are required.

The invention has several advantages including the ability to quickly acquire a 3D representation of an object with minimal skill and interaction required of the user. The elements of this 3D scanner are simple and relatively inexpensive, making the scanner more affordable than prior art 3D scanners. The sensors having pairs of contacts e allow for the highest resolution for the scanner since the pins can be positioned more closely to one another. The sensors that utilize the plunger-type microswitches are very reliable.

While the invention has been shown or described in only some of its forms, it should be apparent to those skilled in the art that it is not so limited, but is susceptible to various changes without departing from the scope of the invention.

. What is claimed is:

1. A computer scanning device for scanning three-dimensional objects, comprising:
 a frame having an axis and a wall with an array of axial pinholes;
 a pin slidably mounted in each of the pinholes in the wall of the frame to form an array of pins extending from the wall, the array of pins being adapted to form a three-dimensional impression of an object when the object is embedded in the array of pins;
 a detection device mounted to the frame and having a sensor plate opposite the wall of the frame, wherein the detection device and the wall of the frame are movable relative to each other;
 an array of sensors mounted to the sensor plate of the detection device, each of the sensors corresponding to and aligning with one of the pins for detecting axial displacement thereof, and the array of sensors having an engaged position wherein at least some of the sensors physically contact associated ones of the pins and a disengaged position wherein the sensors are axially spaced apart from and free of contact with the pins; and
 a computer interface interconnected with the array of sensors and adapted to be interconnected with a computer, such that the three-dimensional impression of the object maybe represented within the computer in response to axial displacement of at least some of the pins.

2. The computer scanning device of claim 1, further comprising a sleeve mounted in each of the pinholes in the wall of the frame for frictionally engaging and limiting movement of the pins.

3. The computer scanning device of claim 1, further comprising:
 a sheet mounted adjacent to the wall; and
 a latching mechanism mounted to the frame for moving the sheet to selectively restrain and release the pins when the impression of the object is made.

4. The computer scaning device of claim 1 wherein the detection device is moved relative to the frame.

5. The computer scanning device of claim 1 wherein each of the sensors comprises a pair of electrical contacts that forms an electrical circuit when contacted by an associated one of the pins.

6. The computer scanning device of claim 1 wherein each of the sensors comprises a latching logic sensor.

7. The computer scanning device of claim 1 wherein each of the sensors comprises a set-reset flip-flop sensor.

8. The computer scanning device of claim 1, further comprising a motor coupled to the detection device and the frame, wherein when the motor moves one of the detection device and the frame relative to the other, the sensors detect the axial displacement of their respective pins and are adapted to enable the computer to reconstruct a three-dimensional representation of the object.

9. The computer scanning device of claim 8 wherein the motor is a stepper motor for incrementally moving said one of the detection device and the frame relative to the other.

10. A computer scanning device for scanning three-dimensional objects, comprising:
 a frame having an axis and a wall with an array of axial pinholes, a front side, and a back side;
 an elongated straight pin slidably mounted in each of the pinholes in the wall of the frame to form an array of pins extending from both sides of the wall, each of the pins having a front end and a back end, wherein the front ends of the array of pins are adapted to be axially displaced by a three-dimensional object to form a three-dimensional impression thereof on the front side of the wall, and a complementary three-dimensional embossment of the object on the back side of the wall when the object is embedded in the array of pins;
 a sleeve mounted in each of the pinholes in the wall of the frame for frictionally engaging and limiting movement the pins:
 a sheet mounted adjacent to the wall;
 latching mechanism mounted to the frame for moving the sheet to selectively restrain and release the pins when the impression of the object is made:
 a detection device movably mounted to the frame and having a sensor plate that is parallel to the wall of the frame and facing the rear ends of the pins;
 a motor coupled to the detection device and the frame;
 an array of sensors mounted to the sensor plate of the detection device, each of the sensors corresponding to and aligning with one of the pins for detecting axial displacement thereof and the array of sensors having an engage position wherein at least some of the sensors physically contact the back ends of associated ones of the pins, and a disengaged position wherein the sensors are axially spaced apart from and free of contact with the back ends of the pins;
 a computer interface including a sensor circuit board with a microcontroller interconnected with the detection device and adapted to be interconnected with a computer, and wherein
  when the motor moves the detection device toward the wall, the sensors individually detect the axial position of their respective pins and are adapted to enable the computer to reconstruct a graphical, three-dimensional representation of the object in response to the axial displacement of at least some of the pins.

11. The computer scanning device of claim 10 wherein each of the sensors comprises a pair of electrical contacts that forms an electrical circuit when contacted by an associated one of the pins.

12. The computer scanning device of claim 10 wherein each of the sensors comprises a latching logic sensor.

13. The computer scanning device of claim 10 wherein each of the sensors comprises a set-reset flip-flop sensor.

14. A method for scanning a three-dimensional object to create a three-dimensional representation of the object by a computer, comprising the steps of:
 (a) providing a scanner with a frame having a wall with an array of axial pinholes, a pin mounted in each of the pinholes to form an array of pins, and a detection device mounted to the frame and having an array of sensors that individually correspond to and align with one of the pins, the array of sensors being axially spaced apart from and free of contact with the pins;

(b) embedding a three-dimensional object in the array of pins to axially displace at least some of the pins to form a three-dimensional impression of the object in the array of pins;

(c) moving one of the wall and the detection device toward the other;

(d) physically contacting each of the pins with respective ones of the sensors to detect the axial position of each of the pins; and then (e) constructing a graphical, three-dimensional representation of the object on a computer that is interconnected with the scanner in response to the axial displacement of said at least some of the pins.

15. The method of claim 14, further comprising the step of frictionally engaging the pins to prevent their incidental movement after the impression is made.

16. The method of claim 14 wherein step (c) comprises moving the detection device toward the wall with a motor.

17. The method of claim 14 wherein step (d) comprises forming an electrical circuit whenever one of the sensors contacts a respective one of the pins.

18. The method of claim 14 wherein step (d) comprises actuating a microswitch whenever one of the sensors contacts a respective one of the pins.

* * * * *